Dec. 26, 1939.   J. L. WOODBRIDGE   2,185,097
NONSPILL VENT PLUG
Filed July 14, 1937
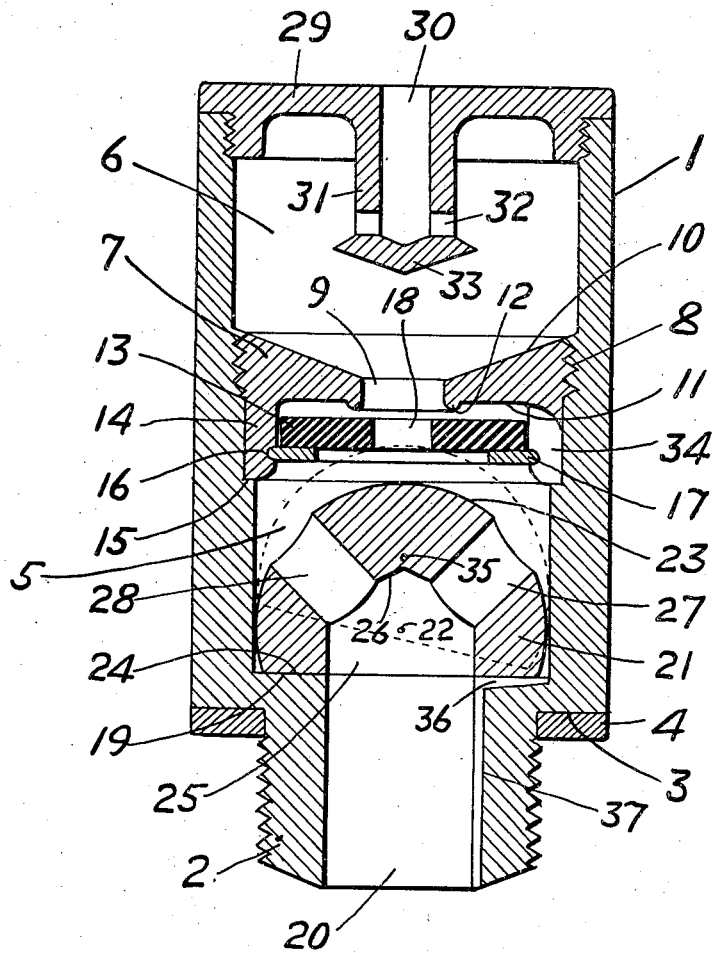
WITNESS:
INVENTOR
Joseph Lester Woodbridge
BY
Augustus B. Stoughton
ATTORNEY.

Patented Dec. 26, 1939

2,185,097

UNITED STATES PATENT OFFICE 2,185,097

NONSPILL VENT PLUG

Joseph Lester Woodbridge, Philadelphia, Pa., assignor to The Electric Storage Battery Company, Philadelphia, Pa., a corporation of New Jersey Application July 14, 1937, Serial No. 153,511

12 Claims. (Cl. 251—147)

An object of my invention is to provide a nonspill vent plug for storage batteries containing liquid electrolyte which evolves gas, said vent plug being arranged to provide for venting gas from the cell when the cell is in its normal position and to close off the vent when the cell is tilted from its normal position by a predetermined amount and thus prevent spilling or escape of electrolyte.

It is a further object of my invention to provide a vent plug which is efficient and effective in operation and simple and economical to manufacture.

For a further exposition of my invention, reference may be had to the annexed drawing and specification, at the end thereof my invention will be specifically pointed out and claimed.

In the drawing:

The single figure is a vertical cross-section.

In the drawing, 1 represents the vent plug generally which is preferably cylindrical in shape and is provided with a depending, cylindrical projection 2 externally threaded for engagement with the internal threads of an appropriate vent opening in the cover of a storage battery cell (not shown). A shoulder 3 is provided to which is applied a soft rubber gasket 4 to provide an airtight seal between the vent plug and the cell cover.

The vent plug is hollow, having a lower cylindrical chamber 5 and an upper cylindrical chamber 6 separated by an annular partition member 7 whose external threads 8 engage corresponding threads on the internal wall of the vent plug. The partition member 7 is provided with an axial orifice 9 providing communication between the lower chamber 5 and the upper chamber 6 of the vent plug. The upper surface of the partition member 7 is conical as at 10, while the lower surface lies in a horizontal plane as at 11, and is provided with a lip or boss 12 surrounding the opening 9 and forming an abutment for the pliable valve seat 13. The partition member 7 has also a depending skirt 14 whose lower edge seats on a shoulder 15 of the internal wall of the vent plug. A groove 16 is provided on the internal wall of the skirt 14 near its lower extremity into which groove a hard rubber annular washer 17 is forced, this washer supporting the valve seat 13 normally out of contact with the lip 12. The valve seat 13 has an axial orifice 18 confronting the orifice 9 in the partition member 7.

The lower chamber 5 is provided with an internal horizontal shoulder 19 surrounding the cylindrical passage 20 passing through the depending projection 2 and thus providing communication with the interior of the cell when the vent plug is in place in the cell cover.

The vent plug is surmounted by a cap 29 closing the top of the upper chamber 5 except for the vent duct 30 in the depending vent tube 31, having horizontal passages 32 leading from the vent duct 30 into the chamber 5. The vent duct 30 is closed at the bottom by the spray baffle 33.

Within the lower chamber 5 is located the valve member 21 which is in the form of the segment of a sphere whose center is located at 22 when the valve member is in its normal position. It will be noted that this spherical segment is appreciably greater than half the sphere and is defined by the spherical surface 23 and the plane surface 24. In the normal position of the valve member, the plane surface 24 rests on the shoulder 19 and the spherical surface closely fits the internal cylindrical wall of the chamber 5, allowing just enough clearance to permit the valve member to roll along the cylindrical wall when the vent plug is tilted through a sufficient angle. It is not absolutely necessary that the upper surface of the shoulder 19 and the lower surface of the valve member 21 should be exactly plane. They might be slightly conical and still give satisfactory results. The valve member is provided with an axial cylindrical cavity 25 having a conical apex 26 and with two cylindrical passages or ducts 27 and 28 extending from the cavity 25 to the external spherical surface of the valve member.

In the normal upright position of the vent plug, there is provided a passage for the escape of gas from the cell through the duct 20, the ducts 27 and 28 in the valve member and the openings 18 and 9 in the valve seat and the partition member into the upper chamber 6 and from there through orifice 32 and vent duct 30 into the atmosphere. When the cell is tilted through a sufficient angle, the valve member 21 will roll into the position shown by the dotted lines, closing the orifice 18 and bringing the valve seat 13 against the annular lip 12 so as to close the passage between the chamber 6 and the chamber 5 and prevent the escape of liquid from the cell.

It will be noted that, on account of the configuration of the valve member 21, its center of gravity is at some point 35 located at an appreciable distance above the center of its spherical surface. On this account, the valve member will roll into the closing position before the vent plug has been tilted through an angle of 90°. This is a desirable feature owing to the fact that liquid might escape from the cell before the angle of tilting has reached 90°.

A narrow slot of capillary width is provided through the depending skirt 14 of the partition member 7 as shown at 34. Several of these slots may be provided around the periphery of this skirt. The object of such slots is to provide a capillary path for draining back any liquid which may collect in the chamber 6 whether by failure of the valve member to close the opening 18 completely or by reason of the trapping of spray from the cell during the gassing period of charge. Since there is usually a certain amount of gas developed in a storage cell even when standing idle, it is necessary to provide for the drainage of this trapped liquid against the escape of gas bubbles through the opening 18. This is provided for by the space between the disk 13 and the underside of the partition member 7, which space communicates with the capillary slots 34, allowing the trapped liquid to pass down around the valve member 21 while the gas bubbles are escaping through the orifices 27 and 28 in the valve member and through the opening 18 in the disk 13. To further provide for this drainage of trapped liquid, one or more capillary grooves are provided in the upper surface of the shoulder 19 as indicated at 36. The groove 36 is continued as a vertical groove 37 in the cylindrical wall of the passage 20. It will thus be seen that there is provided a substantially continuous capillary path for the drainage of trapped liquid from the chamber 6 via the space 11, groove 34, the restricted space between the valve member 21 and the cylindrical wall surrounding it, the grooves 36 and 37, while gas is free to escape from the cell through the various ducts and passages already described.

The design and dimensions of the several parts of the device are such that, when the valve member 21 is in the position indicated by the dotted lines corresponding to the limit of its travel in the direction toward the valve seat, the distance from the center of its spherical surface to the inner edge of the shoulder 19 is less than the radius of the spherical surface, thus preventing the valve member 21 from rotating into a position from which it cannot roll back into its normal position supported on the shoulder 19 when the vent plug is restored to its upright position.

The ducts 27 and 28 through the valve member 21 are so located that, when the valve member has rolled into the position indicated by the dotted lines, neither of these ducts will overlap the opening 18 in the valve seat and allow liquid to escape in the tilted position of the vent plug.

The valve member 21 should preferably be made of relatively heavy material such as lead-antimony alloy.

I do not intend to be limited save as the scope of the prior art and of the attached claims may require.

I claim:

1. In a nonspill vent plug, the combination of walls defining a hollow cylindrical chamber closed above by a member having an axial orifice, a pliable, centrally located and perforated valve seat supported below the orifice, an internal annular shoulder at the bottom of the chamber, and a segmental spherical valve member in the chamber bounded by a spherical surface greater than a hemisphere and an approximately plane surface and adapted normally to rest with its approximately plane surface supported on the shoulder and its spherical surface confronting but spaced away from the valve seat, said valve member having its center of gravity axially displaced an appreciable distance above the center of its spherical surface adapted upon tilting of the plug less than 90° to travel axially with its spherical surface rolling on the cylindrical wall of the chamber to close the perforation and orifice.

2. In combination in a nonspill vent plug for a battery cell in which gas is evolved, walls defining upper and lower chambers, a partition member separating the chambers having an axial orifice, a pliable, centrally perforated valve seat supported below the orifice, a segmental spherical valve member in the lower chamber, said valve member bounded by a spherical surface greater than a hemisphere and an approximately plane surface, the spherical surface having a diameter slightly less than that of the cylindrical wall of the lower chamber, an internal annular shoulder at the bottom of the lower chamber adapted to support the valve member on its approximately plane surface with its upper spherical surface spaced away from the valve seat in the normal position of the plug, the said valve member having its center of gravity axially displaced an appreciable distance above the center of its spherical surface adapted upon tilting of the plug less than 90° to roll on the cylindrical wall of the lower chamber to close the perforation through the valve seat.

3. A nonspill vent plug in accordance with claim 1, in which the closing member is provided with an annular depending skirt having provisions for supporting the valve seat and having a slot communicating with the space above the valve seat and with the chamber below the valve seat to bypass the perforation in the valve seat.

4. A nonspill vent plug in accordance with claim 1 in which the shoulder of the bottom chamber has a capillary groove therein communicating at one end with the space between the valve member and the cylindrical walls of the chamber and at the other end with the space below the valve member.

5. A vent plug for storage batteries, comprising, a hollow body having a passage therethrough and having a normally horizontal partition with an orifice therein forming a portion of said passage, a ring-shaped valve seat having a hole therein smaller than said orifice and movably mounted beneath and spaced from said orifice, and a relatively heavy valve member mounted within said body and normally beneath said valve seat and having a curved surface and movable, so that upon tilting of the vent plug from normal position more than a small amount, the valve member rolls on the inner wall of said body and closes said hole and moves the valve seat so as to close said orifice.

6. A vent plug for storage batteries, comprising, a hollow body having a passage therethrough and having a normally horizontal partition with an orifice therein forming a portion of said passage, a ring-shaped valve seat having a hole therein confronting said orifice and movably mounted beneath and spaced from said orifice, said body having a slot therein forming a portion of said passage in series with said orifice and in bypass relation with said hole and spaced from said orifice and from said hole, and a relatively heavy valve member mounted within said body and normally beneath said valve seat and having a curved surface and movable, so that upon tilting of the vent plug from normal position more than a small amount, the valve member rolls on the inner wall of said body and closes said hole and moves the valve seat so as to close said orifice.

7. A vent plug for storage batteries, comprising: a hollow body having a passage therethrough and having a normally horizontal partition with an orifice forming a part of said passage; a ring-shaped valve seat having a hole therein confronting said orifice and movably mounted beneath and spaced from said orifice; and a perforated, relatively heavy valve member within said body and normally beneath said valve seat and having a flattened surface on which it normally rests and a curved surface and movable, so that, upon tilting of said vent plug more than a small amount from normal position, said valve member closes said hole and moves said valve seat to close said orifice, the perforation in said valve member having an opening in the curved surface, which opening is spaced from said hole in all positions of said valve member.

8. A partition member for a nonspill vent plug comprising, an element having an orifice therethrough, an integral skirt projecting from one wall of said element and encircling said orifice, and a pliable disk forming a valve seat supported in spaced relation to said element by said skirt and having an opening therethrough smaller than said orifice so that said valve seat can be pressed against the walls of said orifice to close off opening therebetween.

9. A partition member for a nonspill vent plug comprising, an element having an orifice therethrough, a lip on said element forming one end of said orifice, an integral skirt on said element encircling said orifice and said lip, and a pliable ring-shaped element having an unobstructed opening smaller than and confronting said orifice supported by said skirt and arranged to be pressed into contact with said lip.

10. A partition member for a nonspill vent plug comprising, an element having an orifice therethrough, a skirt projecting from one face of said element and encircling said orifice, a pliable valve seat of ring-shape having an unobstructed opening smaller than said orifice and supported by said skirt beneath said element and spaced therefrom and adapted to be pressed into contact with the walls of said orifice, and a slot in said skirt of capillary size in at least one direction, connecting the space above the valve seat with the space below it.

11. In a nonspill vent plug, cylindrical walls defining a chamber, a perforated pliable valve seat supported above the chamber, an inwardly projecting support at the bottom of the chamber, and a valve member normally resting on the support and out of contact with the valve seat, said valve member bounded in part by a spherical surface extending on both sides of a co-axial great circle and of radius just enough less than that of the cylindrical wall to provide clearance on which surface, said valve member is adapted to roll on the cylindrical wall of the chamber when the vent plug is tilted at a sufficient angle from the vertical and in part by a spherical surface concentric with the first-named spherical surface and confronting the orifice in the valve member and adapted to close said orifice when said valve member is displaced by said rolling, said valve member bounded in part by a flattened surface on which it normally rests on the support, said valve member having its center of gravity axially displaced a substantial distance from the center of the spherical surfaces and said valve member having a duct therethrough terminating at one end in the flattened base and at the other end at a point in the curved surface between the area on which the valve member rolls and the area bounded by the periphery of the perforation of the valve seat when the valve member has rolled into contact with the valve seat.

12. In a nonspill vent plug, cylindrical walls defining a chamber, an axially perforated pliable valve seat supported above the chamber, an inwardly projecting support at the bottom of the chamber, and a valve member having a flattened base normally resting on the support and having an annular surface just above the base closely fitting the cylindrical wall of the chamber and on which the valve member is adapted to rock when the vent plug is tilted through a sufficient angle from the vertical, and said valve member bounded above by a spherical surface whose center is in the axis of and at a level substantially that of the annular surface on which the valve member is adapted to rock, whereby the travel of said center is substantially in the axis of the cylindrical wall of the chamber, said spherical surface confronting the perforation in the valve seat and adapted to close said perforation upon tilting of the vent plug to rock the valve member to make contact simultaneously between said spherical surface and all points of the periphery of the perforation in the valve seat.

JOSEPH LESTER WOODBRIDGE.